(12) United States Patent  (10) Patent No.: US 7,878,473 B1
Oh  (45) Date of Patent: Feb. 1, 2011

(54) MULTI-FUNCTIONING MOUNT SYSTEM FOR A MONITOR

(75) Inventor: Sung I. Oh, West Covina, CA (US)

(73) Assignee: CLO Systems, LLC

( * ) Notice: Subject to any disclaimer, the term of this patent is extended or adjusted under 35 U.S.C. 154(b) by 0 days.

(21) Appl. No.: 12/624,239

(22) Filed: Nov. 23, 2009

(51) Int. Cl.
| B42F 13/00 | (2006.01) |
| A47B 96/06 | (2006.01) |
| A47F 5/00 | (2006.01) |
| A47F 5/08 | (2006.01) |
| A47H 1/10 | (2006.01) |
| E04G 3/00 | (2006.01) |
| A47G 1/24 | (2006.01) |
| A47G 29/00 | (2006.01) |
| F16M 11/00 | (2006.01) |
| F16B 45/00 | (2006.01) |

(52) U.S. Cl. .................. 248/339; 248/205.1; 248/495; 248/490; 248/918; 248/690; 248/304; 248/301

(58) Field of Classification Search .................. 248/339, 248/205.1, 298.1, 475.1, 489, 190, 495, 490, 248/292.14, 918, 690, 304, 301
See application file for complete search history.

(56) References Cited

U.S. PATENT DOCUMENTS

| 7,070,156 B2 * | 7/2006 | Liao ........................... 248/466 |
| 7,316,379 B1 * | 1/2008 | Graham ................... 248/298.1 |
| 7,637,465 B2 * | 12/2009 | Huang .................... 248/222.13 |
| 2005/0253035 A1 * | 11/2005 | Dozier .................... 248/286.1 |
| 2007/0023375 A1 * | 2/2007 | Fedewa ....................... 211/103 |
| 2007/0023593 A1 * | 2/2007 | Fedewa ...................... 248/201 |
| 2007/0251893 A1 * | 11/2007 | Huang ......................... 211/26 |
| 2007/0258196 A1 * | 11/2007 | Koskinen et al. ............ 361/681 |
| 2008/0105801 A1 * | 5/2008 | Dozier .................... 248/205.1 |
| 2008/0237426 A1 * | 10/2008 | Walters ................... 248/316.8 |
| 2009/0184221 A1 * | 7/2009 | Sculler .................. 248/221.11 |
| 2009/0206214 A1 * | 8/2009 | David ..................... 248/205.1 |

* cited by examiner

*Primary Examiner*—Terrell Mckinnon
*Assistant Examiner*—Christopher Garft

(57) ABSTRACT

A mount system for a monitor attaches the monitor to a supporting surface such as a wall in two positions. In the first position, the mount system attaches the monitor in a flush position, and in the second position, the mount system attaches the monitor in a tilt position.

12 Claims, 9 Drawing Sheets

MULTI-FUNCTIONING MOUNT SYSTEM FOR A MONITOR

FIELD OF THE INVENTION

This invention is directed to a mount system that is adapted to couple to a back side of a monitor and reposition the viewing angle of the monitor, and in particular, function both as a flush mount and a tilt mount.

BACKGROUND OF THE INVENTION

Flat panel monitors such as computer monitors, LCD, plasma, slim televisions, and the like (collectively referred to as "monitor(s)") are becoming popular because they can be mounted onto a wall to save floor space and for their aesthetically pleasing appearance. Moreover, the recent trend is to make the flat screen monitors slim as possible. For instance, some monitors are now less than 1.0 inch in thickness. And with such slim monitors, it is desirable to mount the monitor close to the wall as possible.

A flush mount is one of the popular mounts to attach the monitor close to a wall. In general, a flush mount is provide with a wall plate that is adapted to attach to the wall; and a pair of panel mounting brackets adapted to attach to the rear side of the monitor and then anchor to the wall plate. Flush mounts attach the monitor in an upright position against the wall, and they do not offer tilting function. Without the tilting function, the flush mounts are generally designed to be less than 1.0" thin so they can attach the monitor very close to the wall. However, when the monitor is attached close to the wall, it is more difficult to install the monitor to the wall.

In many instances when the monitor is mounted to a wall, TV viewers prefer to have the monitor tilt down a bit so that the viewers can more comfortably view the monitor. In such instances, rather than a flush mount, a tilt mount is used to attach the monitor to the wall. The added tilt mechanism, however, adds depth to the tilt mount so that the overall depth of the tilt mount is usually deeper than a flush mount. Moreover, to provide the tilt function, the monitor needs to be some distance away from the wall so that the bottom of the monitor does not hit the wall, thereby preventing the monitor from tilting down. The added tilt function also adds to the costs— so that a tilt mount generally costs more than a comparable flush mount.

During the purchasing stage of the mount, the buyers usually weigh the pros and cons between the flush and tilt mounts, and pick one depending on their application and budget. Accordingly, there is a need for a mount system that can offer the benefits of both flush and tilt mounts without their above-mentioned dis-advantages.

SUMMARY OF THE INVENTION

A mount system for a monitor attaches the monitor to a supporting surface such as a wall in two positions. In the first position, the mount system attaches the monitor in a flush position; and in the second position, the mount system attaches the monitor in a tilt position. In this regard, the mount system may include: a mounting plate adapted to couple to the supporting surface, the mounting plate having a first lip and a second lip, and when the mounting plate is in use, the first lip being on top relative to the second lip; and a first panel mounting bracket having a longitudinal axis and having: a first base adapted to couple to a rear side of the monitor, a first side wall having: a first hook adapted to latch over the first lip of the mounting plate, and a second hook adapted to latch over the first lip of the mounting plate, and when the first panel mounting bracket is in us, the first hook is on top along the longitudinal axis relative to the second hook, and the second hook is farther away from the first base relative to the first hook such that when the second hook is latched over the first lip of the mounting plate, the monitor has a greater tilt angle relative the supporting surface compared to when the first hook is latched over the first lip of the mounting plate.

The mount system may also include a second panel mounting bracket having a longitudinal axis and having: a second base adapted to couple to a rear side of the monitor, a second side wall having: a first hook adapted to latch over the first lip of the mounting plate, and a second hook adapted to latch over the first lip of the mounting plate, and when the second panel mounting bracket is in us, the first hook of the second panel mounting bracket is on top along the longitudinal axis relative to the second hook of the second panel mounting bracket, and the second hook of the second panel mounting bracket is farther away from the second base relative to the first hook of the second panel mounting bracket such that when the second hook is latched over the first lip of the mounting plate, the monitor has a greater tilt angle relative the supporting surface compared to when the first hook is latched over the first lip of the mounting plate.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
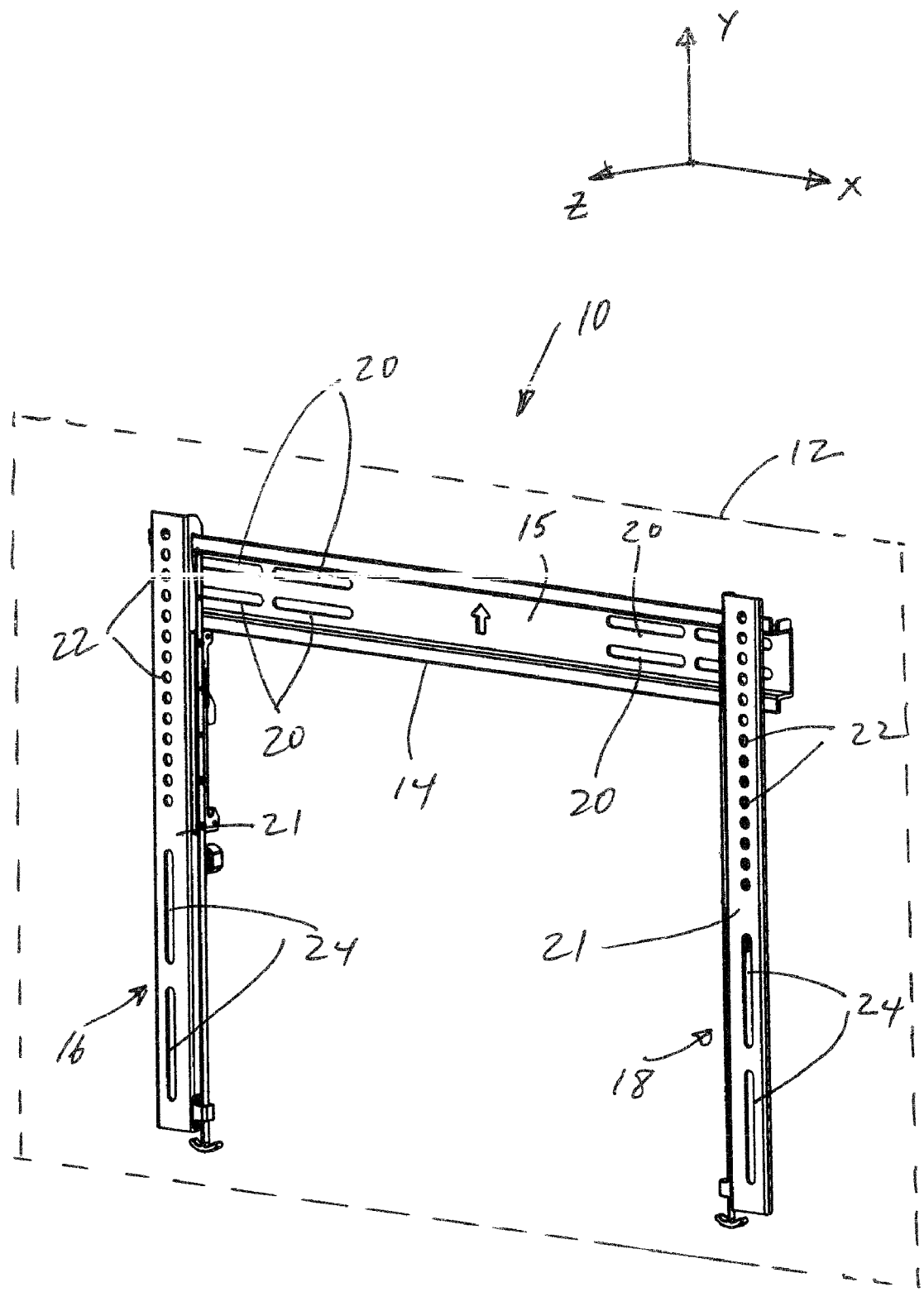
FIG. 1 shows a perspective view of a mount system in reference to a XYZ coordinates.

FIG. 1 shows a perspective view of a mount system 10, in reference to a XYZ coordinates. In general, the gravitational force may be in the −Y direction. FIG. 1 shows the mount system 10 in a first position where a monitor 12 may be in an upright position or along the XY plane. The mount system 10 may include a mounting plate 14; and first and second panel mounting plates 16 and 18. The mounting plate 14 may have a base 15 with a plurality of elongated openings 20 adapted to receive anchor bolts to attach the mounting plate to a wall. Each of the brackets 16 and 20 may have a base 21 with plurality of holes 22 and elongated openings 24 adapted to receive screws to attach the brackets 16 and 18 to the rear side of the monitor 12.

Figure 2:
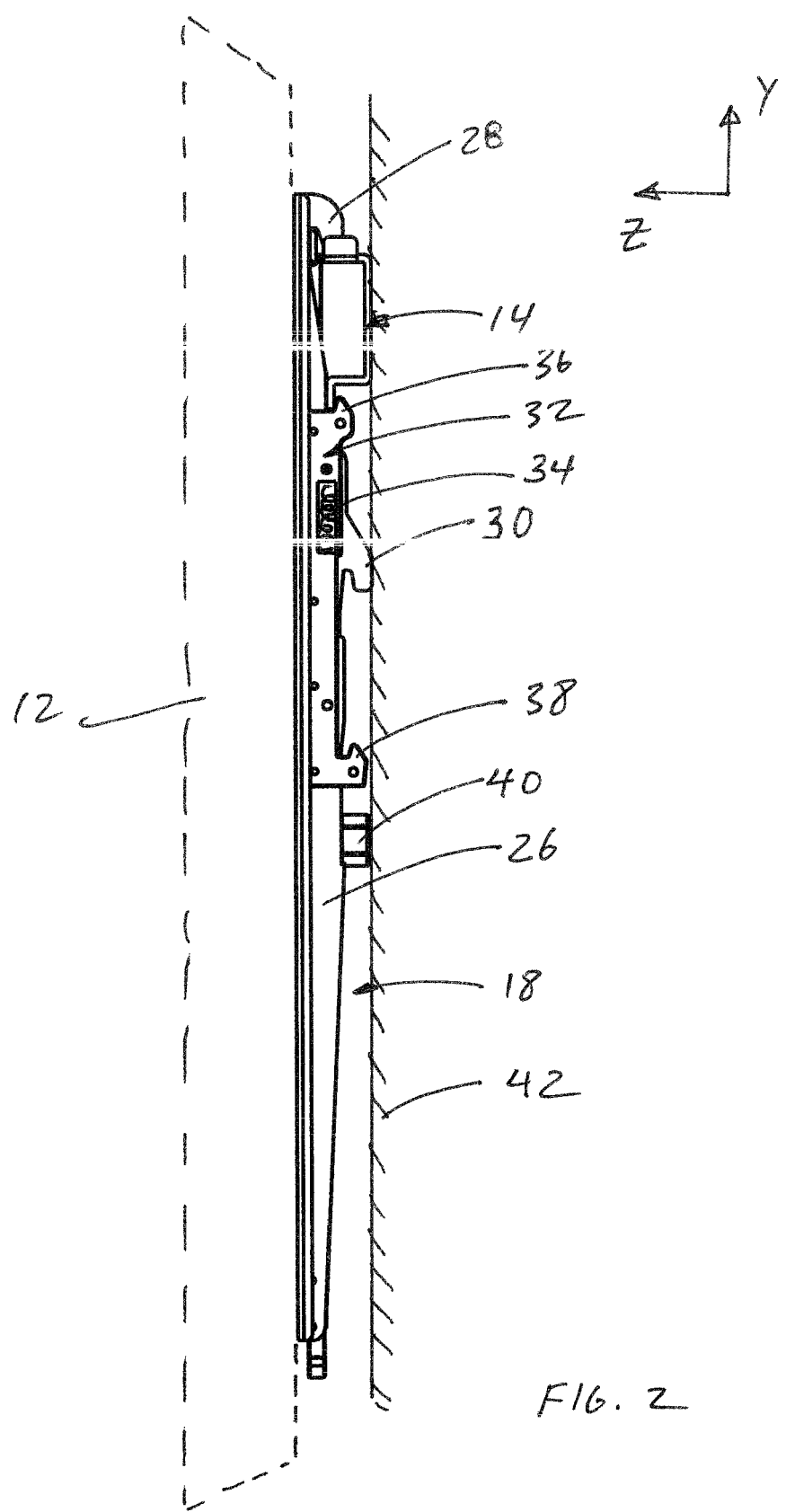
FIG. 2 shows a side view of the mount system in a first position.

FIG. 2 shows a side view of the mount system 10 showing the side of the second panel mounting bracket 18, which is substantially similar to the first panel mounting bracket 16. As such, for purpose of this disclosure, the details of the bracket 18 will be discussed, which will be applicable to the bracket 16. The bracket 18 includes a side wall 26 with a first hook 28 and a second hook 30. In the first position, the first hook 20 latches over the mounting plate 14 as explained in more detail below. The bracket 18 may also include a latching mechanism 32 that is adapted to slide along the longitudinal axis of the bracket 18 or along the Y axis between a first position, as shown in FIG. 2, and a second position, which is in the −Y direction relative the first position. A spring 34 may be incorporated between the side wall 26 and the latching mechanism 32 to bias the latching mechanism in the first position. The latching mechanism 32 may have a first hook 36 and a second hook 38 adapted to latch onto the mounting plate 14 as explained in more detail below. The bracket 18 may also have a stopper 40 that is adapted to lean against the wall 42 in the first position so that the monitor 12 may be substantially in the upright position or along the XY plane.

Figure 3:
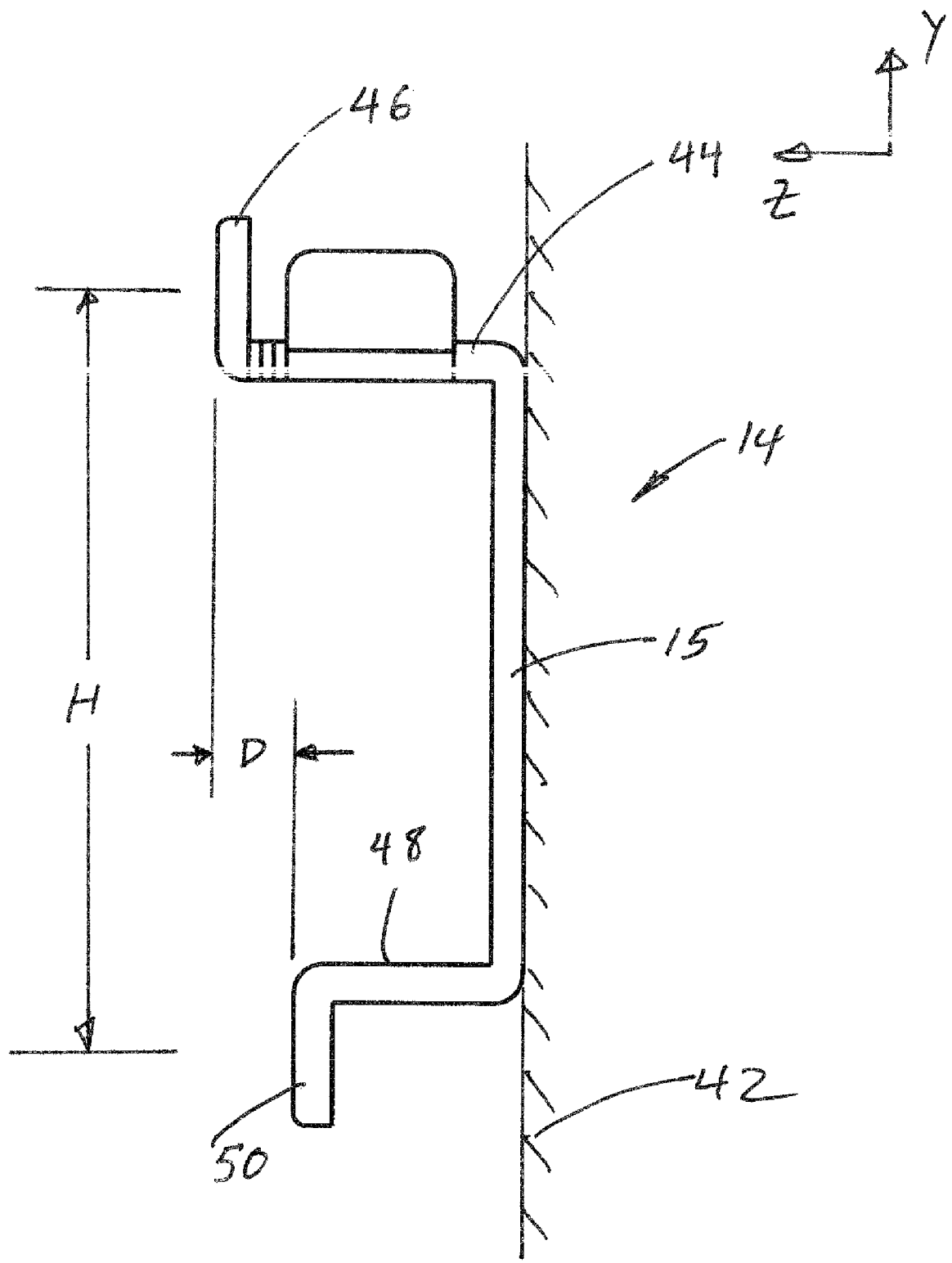
FIG. 3 shows the side view of the mounting plate.

FIG. 3 shows the side view of the mounting plate 14 having a base 15 adapted to anchor to the wall 42. The base 15 may extend to form a first flange 44, which further extends to form a first lip 46. The base 15 may also extend to form a second flange 48, which further extends to form a second lip 50. The first flange 44 may be longer than the second flange 48 so that the first lip 46 may be distance D farther along the +Z direction relative to the second lip 46. In the first position, the mounting plate 14 may be positioned so that the first lip 46 may be distance H farther along the +Y direction relative the second lip 50.

Figure 4:
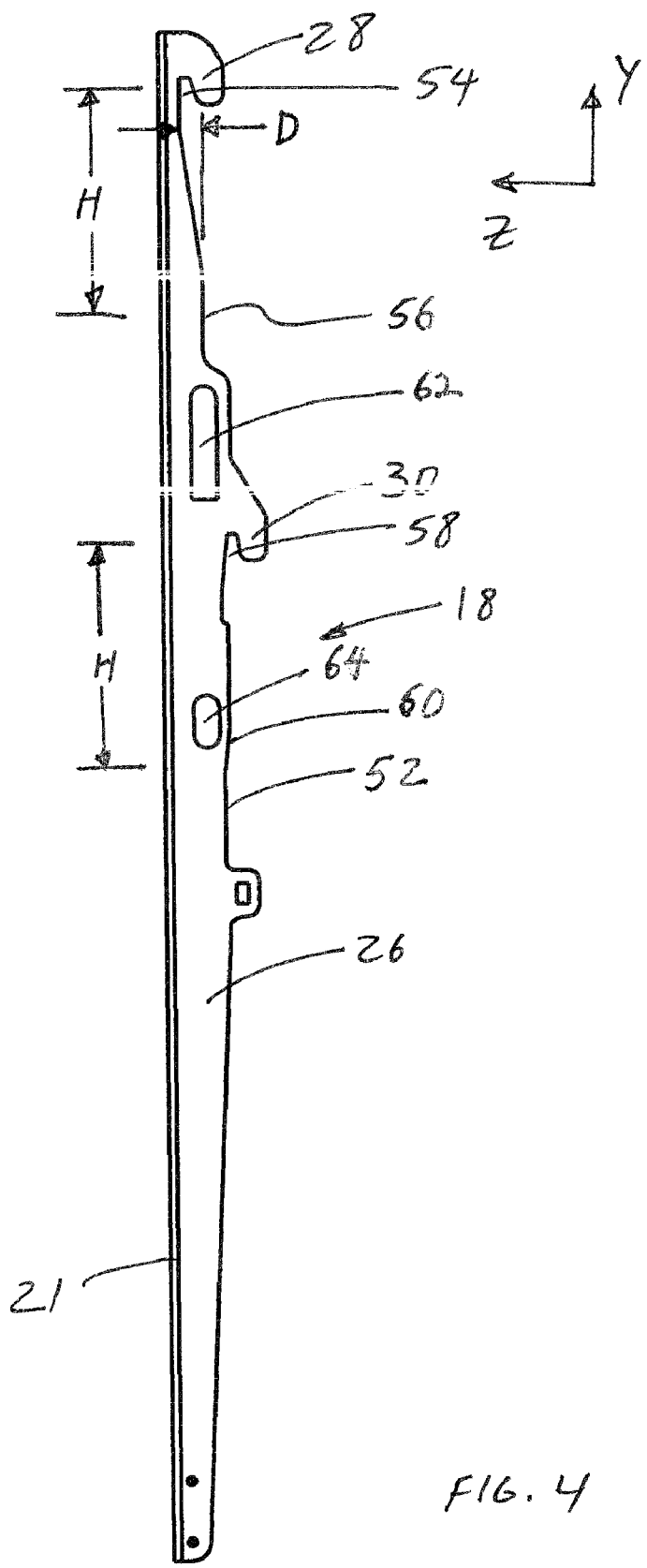
FIG. 4 shows the side view of one of the brackets without the latching mechanism.

FIG. 4 shows the side view of the bracket 18 without the latching mechanism 32 showing the details of the outer edge 52 of the side wall 26. The outer edge 52 defines the locations of the first hook 28 and the second hook 30. In the first position, the first hook 28 may be located in the +Y and +Z location relative to the second hook 30. The first and second hooks 28 and 30 are adapted to latch over the first lip 46 of the mounting plate 14. Juxtaposed to the first hook 28, the outer edge 52 may define a first leaning edge 54 and a second leaning edge 56. The two edges 54 and 56 may be H distance apart and both edges 54 and 56 may be substantially along the Y axis. The first leaning edge 54 may be offset in the +Z direction by a distance D relative to the second leaning edge 56.

Juxtaposed to the second hook 30, the outer edge 52 may define a third leaning edge 58 and a fourth leaning edge 60. The two edges 58 and 60 may be H distance apart, and both edges 58 and 60 may be tapered towards the −Z direction as the outer edge 52 moves in the +Y direction. The third and fourth leaning edges 58 and 60 may be located at about the same location along the Z axis; or the distance between the edge 58 and base 21, and the distance between the edge 60 and the base 21 may be about the same. The side wall may have a first elongated opening 62 adapted to receive the spring 34. The sidewall may also have a second opening 64 elongated along the longitudinal axis of the bracket 18. The latching mechanism 32 may engage with the second opening 64 so that the latching mechanism slides along the longitudinal axis of second opening 64.

Figure 5:
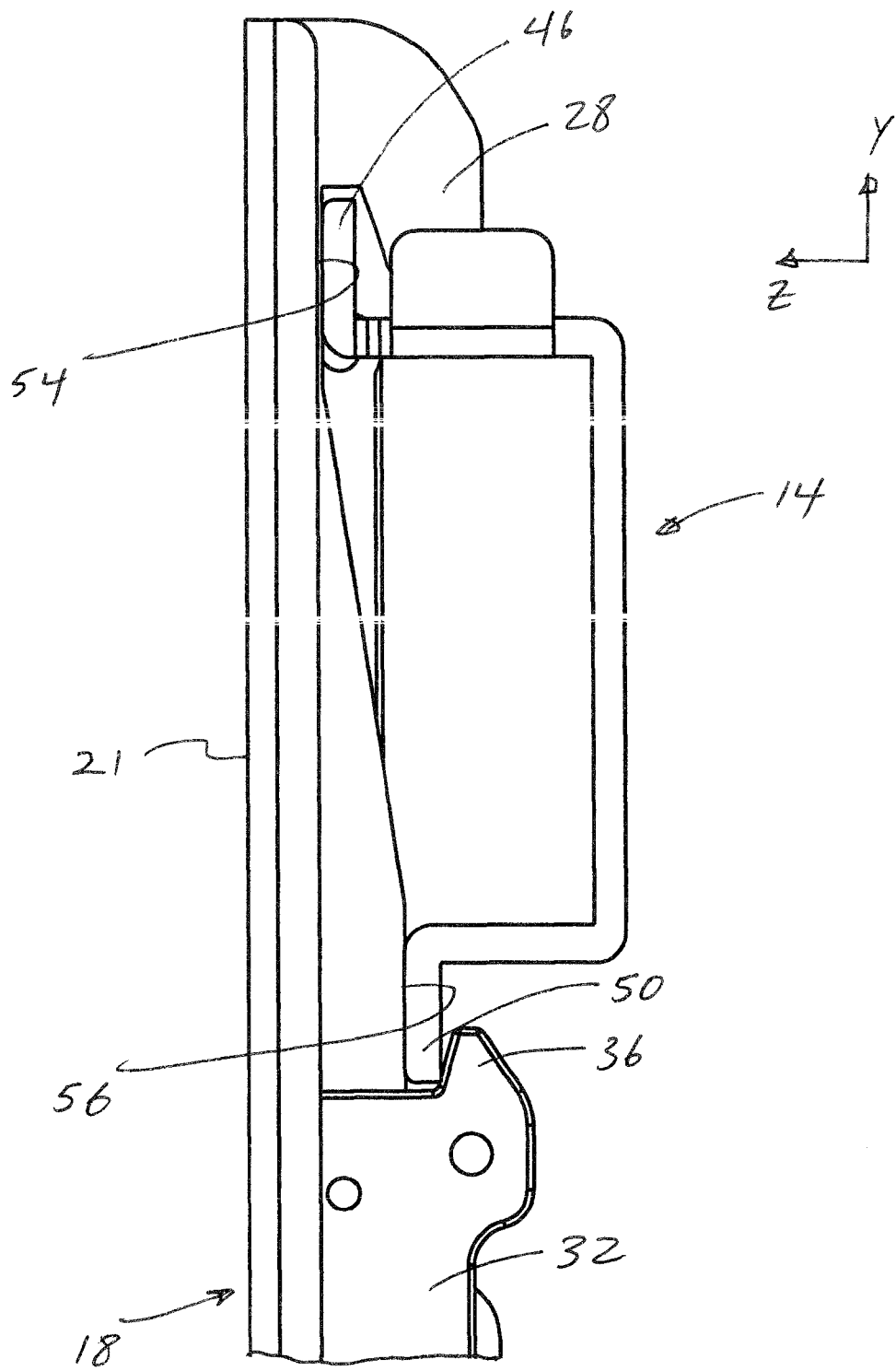
FIG. 5 shows a close up side view of one of the hooks latched over the mounting plate.

FIG. 5 shows a close up side view of the first hook 28 latched over the first lip 46 of the mounting plate 14. In the first position, the first leaning edge 54 is adjacent to the first lip 46 and the second leaning edge 56 is adjacent to the second lip 50; and with the first and second lips being offset by the distance D, and the first and second leaning edges being offset by a similar distance D, the base 21 of the second panel mounting bracket 18 may be positioned substantially in an upright position or along the Y axis. The first hook 36 of the latching mechanism 32 engages the second lip 50 to securely anchor the bracket 18 onto the mounting plate 14. The spring 34 may apply sufficient force to the first hook 36 so that the bracket 18 does not unintentionally disengage with the mounting plate 14.

Referring back to FIG. 2, in the first position, the brackets 16 and 18 may attach the monitor 12 onto the mounting plate 14 in a substantially upright manner. Note that the depth of the stopper 40 may be adjusted to offset the variances with the walls such as when the wall is not perfectly vertical.

Figure 6:
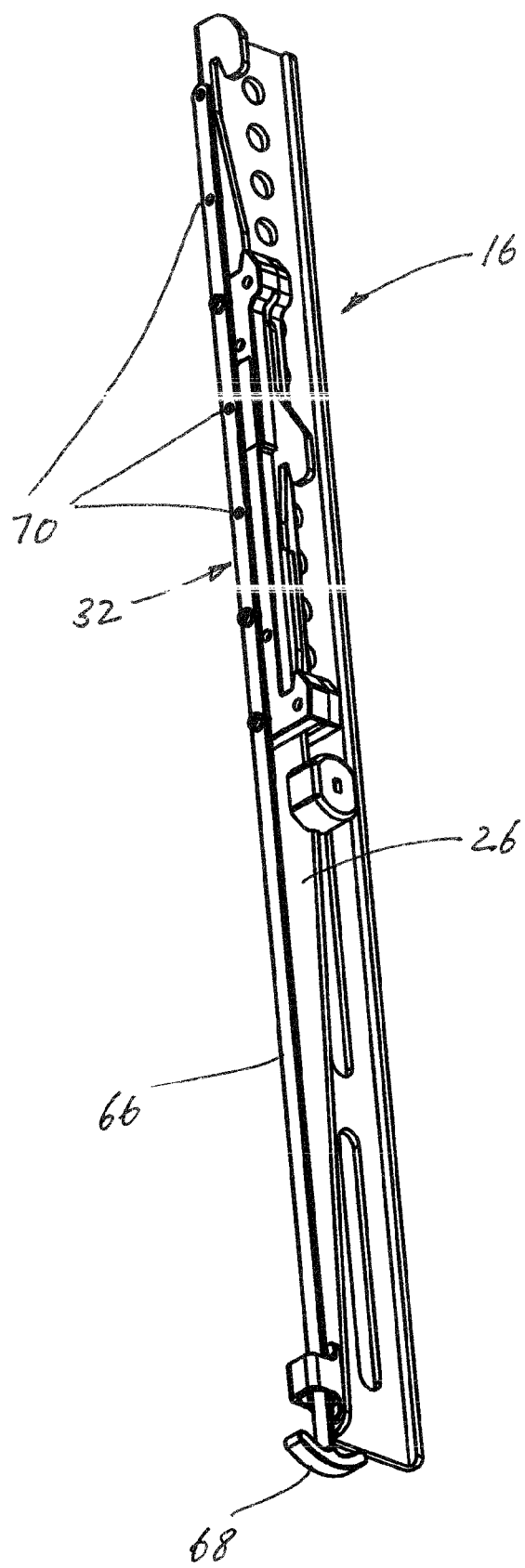
FIG. 6 shows a rear perspective view of one of the first panel mounting bracket.

FIG. 6 shows rear perspective view of the first panel mounting bracket 16. The latching mechanism 32 may be slideably engaged with the side wall 26. The latching mechanism 32 may include a strap 66 with a handle 68 at its end. The strap 66 may have a plurality of holes 70 adapted to receive screws so that the strap 66 may be attached to the mechanism 32. The length of the strap 66 may be adjusted depending on the holes which are used to attach the strap onto the mechanism 32. This way, the location of the two handles 68 for each of the brackets 16 and 18 may be positioned just above the bottom of the monitor depending on the size of the monitor. As the user pulls down on the two handles 68, the first hooks 36 releases from the second lip 50 to allow the two brackets 16 and 18 to disengage with the plate 14.

Figure 7:
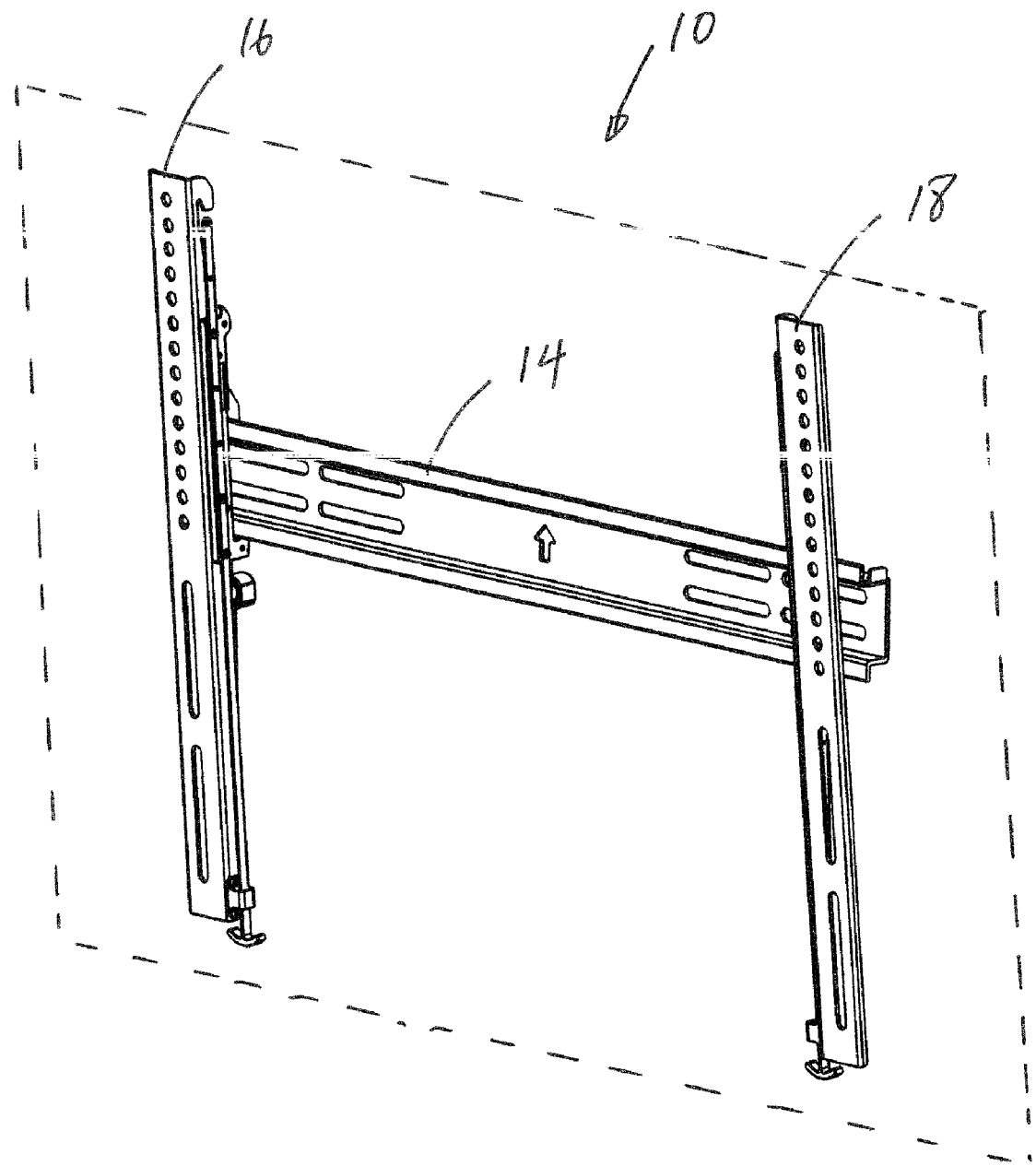
FIG. 7 shows the mount system in a second position.
Figure 8:
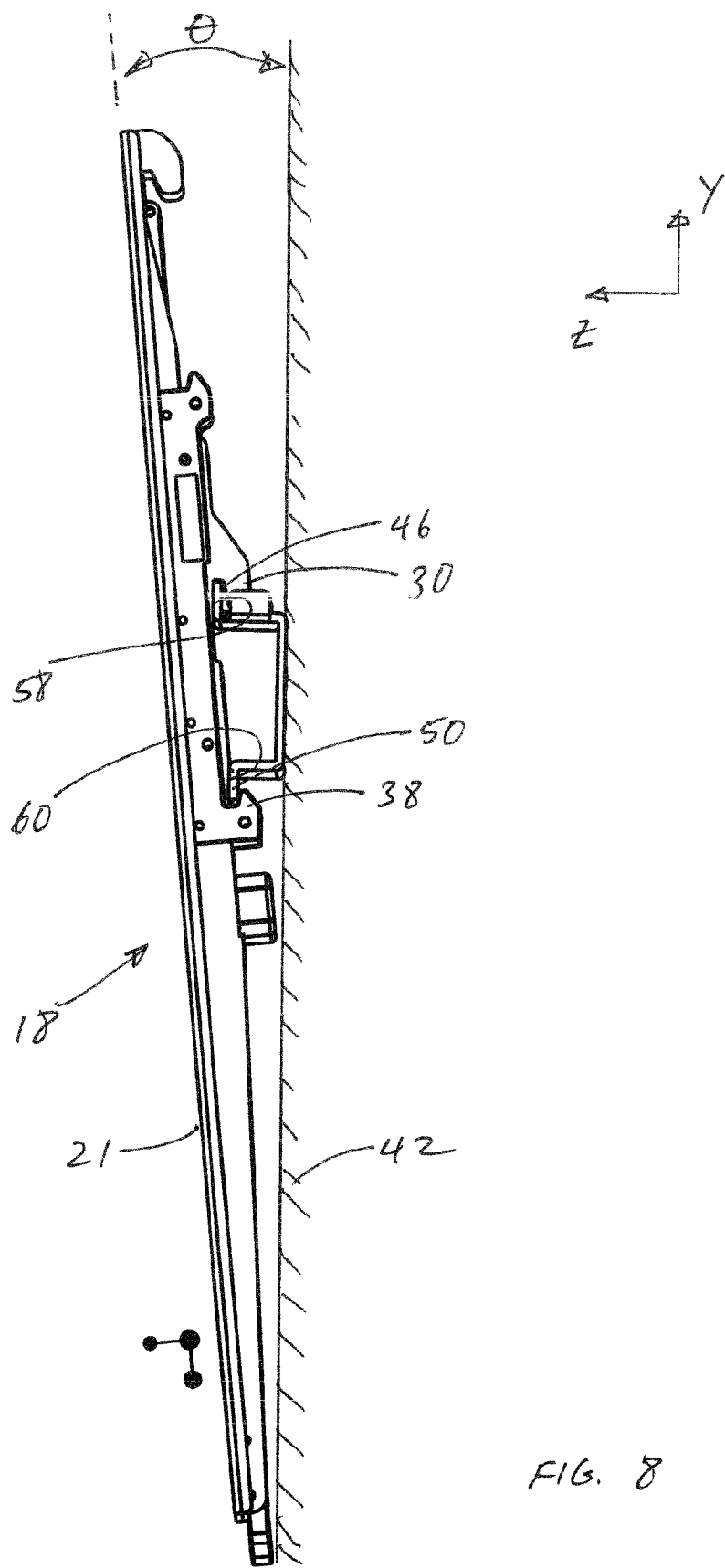
FIG. 8 shows a side view of one of the brackets in the second position where the bracket tilts down angle θ relative the XY plane or the wall.

FIG. 7 shows the mount system 10 in a second position where the second hooks 30 from the brackets 16 and 18 are used to latch over the first lip 46 of the mounting plate 14. FIG. 8 shows the side view of the bracket 18 in the second position, where the bracket 18 tilts down angle θ relative the XY plane or the wall 42. In the second position, the third leaning edge is adjacent to the first lip 46, and the fourth leaning edge is adjacent to the second lip 50; and with the first and second lips 46 and 50 offset by distance D, the third leaning edge 58 may be farther away from the wall 42 than the fourth leaning edge 60 to tilt the base 21 of the bracket 18 downward. The second hook 38 of the latching mechanism 32 engages the second lip 50 to securely anchor the bracket 18 onto the mounting plate 14.

Figure 9:
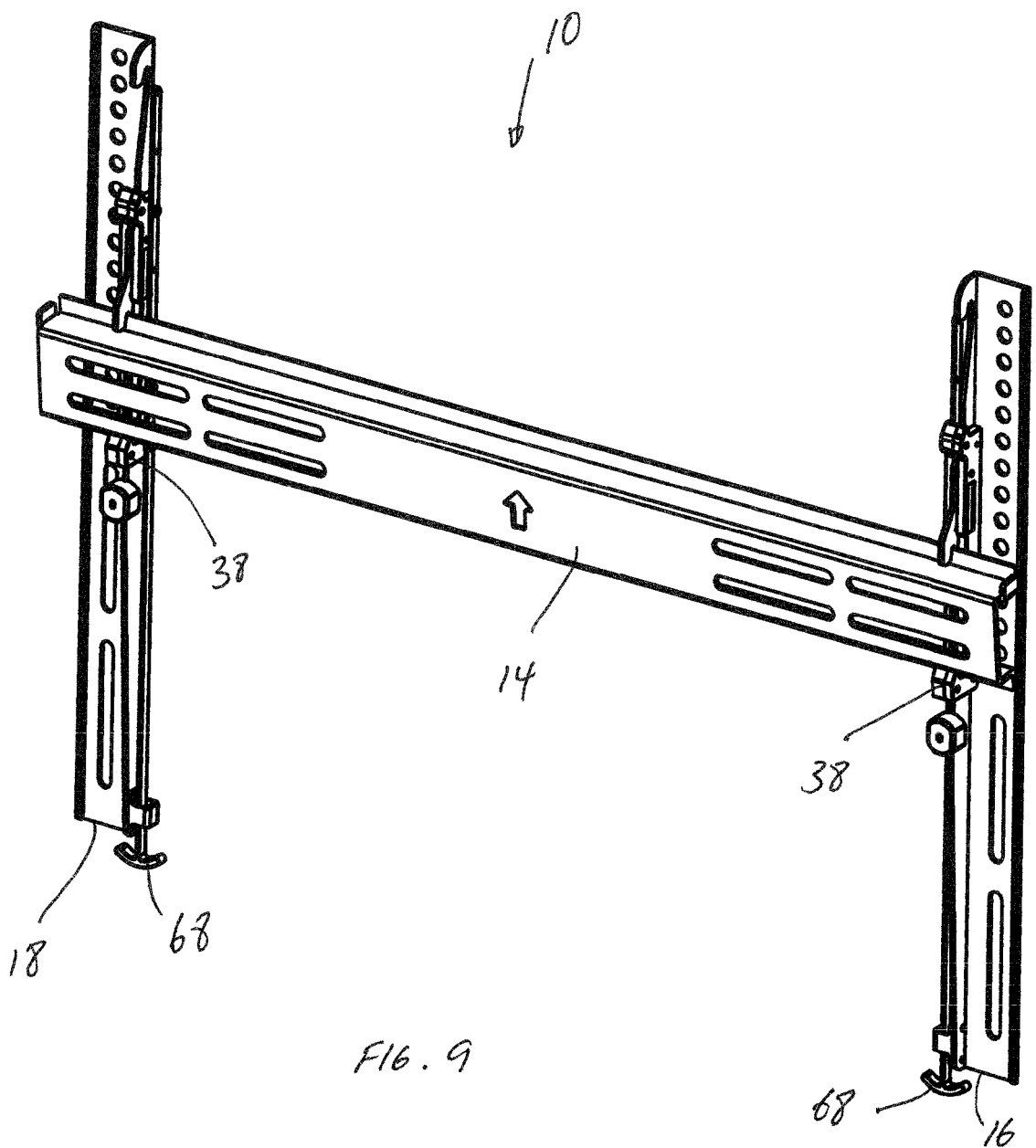
FIG. 9 shows a rear perspective view of the mount system in the second position.

FIG. 9 shows a rear perspective view of the mount system 10 in the second position. To release the brackets 16 and 18 from the mounting plate 14, the handles 68 may be pulled down towards the −Y direction, which causes the second hooks 38 to release from the second lip 50. This allows the bracket 18 to be released from the mounting plate 14 or tilt the bracket 18 upwards to allow access to the rear bottom side of the monitor connect the cables and power cords.

Note that a variety of factors may determine the tilt angle θ such as the depth of the first flange 44 relative to the second flange 48. Another factor is the location of the second hook 30 along the longitudinal axis of the bracket 18. For instance, if the second hook 30 is located in −Y direction relative to the current location, then the tilt angle θ may be increased. As described above, the mount system 10 may be used as a flush mount or a fixed tilt mount depending on the application by latching the first hook 28 or the second hook 30, respectively, onto the mounting plate 14.

While various embodiments of the invention have been described, it will be apparent to those of ordinary skill in the art that many more embodiments and implementations are possible within the scope of this invention. For instance, the first and second lips 46 and 50 may not be offset; rather the first and second edges 54 and 56 may be located at about the same location for the flush position, and the third and fourth leaning edges 58 and 52 may be offset to provide the tilt on the bracket. In another example, the depth of the stopper 40 may be adjustable to provide variable positioning between the flush and tilt positioning. Yet in another example, one panel mounting bracket may be provided instead of two panel mounting brackets. In this example, the one panel mounting bracket may have a base between two side walls, and the two side walls may have the hook patterns described above. Accordingly, the invention is not to be restricted except in light of the attached claims and their equivalents.

What is claimed is:

1. A mount system adapted to attach a monitor to a supporting surface, the mount system comprising:
    a mounting plate adapted to couple to the supporting surface, the mounting plate having a first lip and a second lip, and when the mounting plate is in use, the first lip being on top relative to the second lip, where the mounting plate has a base between the first lip and the second lip, and the first lip is farther away from the base relative to the second lip; and
    a first panel mounting bracket having a longitudinal axis and having:
        a first base adapted to couple to a rear side of the monitor,
        a first side wall having:
            a first hook adapted to latch over the first lip of the mounting plate, and
            a second hook adapted to latch over the first lip of the mounting plate, and when the first panel mounting bracket is in us, the first hook is on top along the longitudinal axis relative to the second hook, and the second hook is farther away from the first base relative to the first hook such that when the second hook is latched over the first lip of the mounting plate, the monitor has a greater tilt angle relative the supporting surface compared to when the first hook is latched over the first lip of the mounting plate.

2. The mount system according to claim 1 further including a second panel mounting bracket having a longitudinal axis and having:
    a second base adapted to couple to a rear side of the monitor,
    a second side wall having:
        a first hook adapted to latch over the first lip of the mounting plate, and
        a second hook adapted to latch over the first lip of the mounting plate, and when the second panel mounting bracket is in us, the first hook of the second panel mounting bracket is on top along the longitudinal axis relative to the second hook of the second panel mounting bracket, and the second hook of the second panel mounting bracket is farther away from the second base relative to the first hook of the second panel mounting bracket such that when the second hook is latched over the first lip of the mounting plate, the monitor has a greater tilt angle relative the supporting surface compared to when the first hook is latched over the first lip of the mounting plate.

3. The mount system according to claim 1, where the mounting plate has a base between the first lip and the second lip, the base having a plurality of openings adapted to receive one or more screws to attach the mounting plate the supporting surface.

4. The mount system according to claim 1, where the first side wall has a first leaning edge and a second leaning edge, the first leaning edge adjacent to the first hook, the second leaning edge positioned to be adjacent to the second lip when the first hook is latched over the first lip of the mounting plate, and the second leaning edge is farther away from the first base relative to the first leaning edge.

5. The mount system according to claim 4, where the first side wall has a third leaning edge and a fourth leaning edge, the third leaning edge adjacent to the second hook, and the fourth leaning edge positioned to be adjacent to the second lip when the second hook is latched over the first lip of the mounting plate, and the third leaning edge is about the same distance from the first base relative to the fourth leaning edge.

6. The mount system according to claim 1, including a latching mechanism having a first hook and a second hook, where the first hook of the latching mechanism is adapted to engage with the second lip when the first hook of the panel mounting bracket is latched over the first lip, and the second hook of the latching mechanism is adapted to engage with the second lip when the second hook of the panel mounting bracket is latched over the first lip.

7. The mounting system according to claim 6, where the latching mechanism is adapted to slide along the longitudinal axis of the panel mounting bracket.

8. The mount system according to claim 6, where the latching mechanism includes a strap with a handle on one end of the strap, where pulling down on the handle causes the second hook of the latching mechanism to disengage with the second lip.

9. A mount system adapted to attach a monitor to a supporting surface, the mount system comprising:
    a mounting plate adapted to couple to the supporting surface, the mounting plate having a first lip and a second lip, and when the mounting plate is in use, the first lip being on top relative to the second lip;
    a first panel mounting bracket having a longitudinal axis and having:
        a first base adapted to couple to a rear side of the monitor,
        a first side wall having:
            a first hook adapted to latch over the first lip of the mounting plate, and
            a second hook adapted to latch over the first lip of the mounting plate, and when the first panel mounting bracket is in us, the first hook is on top along the longitudinal axis relative to the second hook, and the second hook is farther away from the first base relative to the first hook such that when the second hook is latched over the first lip of the mounting plate, the monitor has a greater tilt angle relative the supporting surface compared to when the first hook is latched over the first lip of the mounting plate; and
    a latching mechanism having a first hook and a second hook, where the first hook of the latching mechanism is adapted to engage with the second lip when the first hook of the panel mounting bracket is latched over the first lip, and the second hook of the latching mechanism is adapted to engage with the second lip when the second hook of the panel mounting bracket is latched over the first lip.

10. A mount system adapted to attach a monitor to a supporting surface, the mount system comprising:
    a mounting plate adapted to couple to the supporting surface, the mounting plate having a first lip and a second lip, and when the mounting plate is in use, the first lip being on top relative to the second lip, the mounting plate having a base between the first lip and the second lip, and the first lip is farther away from the base relative to the second lip; and
    a first panel mounting bracket having a longitudinal axis and having:
        a first base adapted to couple to a rear side of the monitor, and
        a first side wall having a first hook and a second hook along the longitudinal axis, the first and second hook adapted to latch over the first lip, and when the first panel mounting bracket is in us, the first hook is on top along the longitudinal axis relative to the second hook.

11. The mount system according to claim 10, where the second hook is farther away from the first base relative to the first hook such that when the second hook is latched over the first lip of the mounting plate, the monitor has a greater tilt angle relative the supporting surface compared to when the first hook is latched over the first lip of the mounting plate.

12. The mount system according to claim 10, including a latching mechanism having a first hook and a second hook, where the first hook of the latching mechanism is adapted to engage with the second lip when the first hook of the panel mounting bracket is latched over the first lip, and the second hook of the latching mechanism is adapted to engage with the second lip when the second hook of the panel mounting bracket is latched over the first lip.

* * * * *